(12) United States Patent
Lee et al.

(10) Patent No.: US 8,130,432 B2
(45) Date of Patent: Mar. 6, 2012

(54) SPACE SCANNER FOR SELF-CONTROL MOVING OBJECT

(75) Inventors: Back Kue Lee, Gyunggi-do (KR); Gil Han Park, Gyunggi-do (KR); Hong Ki Kim, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 297 days.

(21) Appl. No.: 12/485,613

(22) Filed: Jun. 16, 2009

(65) Prior Publication Data

US 2010/0027088 A1 Feb. 4, 2010

(30) Foreign Application Priority Data

Aug. 4, 2008 (KR) .................. 10-2008-0076155

(51) Int. Cl.
*G02B 26/10* (2006.01)
(52) U.S. Cl. ............... 359/200.1; 359/214.1; 359/221.3; 359/872

(58) Field of Classification Search .... 359/198.1–200.4, 359/212.1, 212.2, 214.1, 220.1, 221.1, 221.3, 359/871, 872
See application file for complete search history.

(56) References Cited

U.S. PATENT DOCUMENTS

| 4,499,490 | A | * | 2/1985 | Morgan | 348/37 |
| 7,190,465 | B2 | * | 3/2007 | Froehlich et al. | 356/601 |
| 2010/0073749 | A1 | * | 3/2010 | Noh et al. | 359/200.1 |

FOREIGN PATENT DOCUMENTS

| JP | 7-212313 | * | 8/1995 |
| JP | 10-020035 | | 1/1998 |

* cited by examiner

*Primary Examiner* — Frank Font
(74) *Attorney, Agent, or Firm* — McDermott Will & Emery LLP

(57) ABSTRACT

Provided is a space scanner for a self-control moving object. The space scanner has a structure in which a reflective mirror is rotated and tilted. Thus, the space scanner can scan a moving object in horizontal and vertical directions to secure spatial-data, thereby performing a self-control movement.

10 Claims, 5 Drawing Sheets

SPACE SCANNER FOR SELF-CONTROL MOVING OBJECT

CROSS-REFERENCE TO RELATED APPLICATIONS

This application claims the priority of Korean Patent Application No. 2008-76155 filed on Aug. 4, 2008, in the Korean Intellectual Property Office, the disclosure of which is incorporated herein by reference.

BACKGROUND OF THE INVENTION

1. Field of the Invention

The present invention relates to a space scanner for a self-control moving object, and more particularly, to a space scanner for a self-control moving object in which a reflective mirror is rotated and tilted to scan a moving object in horizontal and vertical directions, thereby securing spatial-data.

2. Description of the Related Art

A self-control moving apparatus such as a mobile robot senses a surrounding object and measures a distance between oneself and the surrounding object using a laser or ultrasonic waves to recognize one's position and determine a moving direction.

The laser is used for further precisely measuring the distances between the self-control moving apparatus and the surrounding object. In this case, the self-control moving apparatus senses a laser reflected from the surrounding object and calculates the travel time of the laser to measure the distance therebetween.

A related art self-control moving apparatus adopting such a laser range finding method scans a laser irradiated in a straight direction along a two-dimensional horizontal surface. Thus, the apparatus can sense only surrounding objects that are positioned at a specific height equal to that of a laser irradiation device and measures distances therebetween.

That is, there is a limitation that the apparatus senses only the objects positioned on the horizontal surface equal to that of the laser irradiation device, and thus, it is impossible to scan other objects except the objects positioned on the horizontal surface, thereby obtaining only distance data with respect to a specific horizontal surface.

However, as consumers' demands for a self-control moving apparatus capable performing a further precise moving operation and various operations increase, it is difficult to secure sufficient stability and functionality of the operation of the self-control moving apparatus using only the distance data with respect to the specific horizontal surface.

SUMMARY OF THE INVENTION

An aspect of the present invention provides a space scanner for a self-control moving object that can scan a moving object in horizontal and vertical directions and detect a distance between the moving object and a surrounding obstacle to secure spatial-data, thereby performing a self-control movement.

According to an aspect of the present invention, there is provided a space scanner for a self-control moving object, including: a rotary driver generating a rotating force; a mirror body rotated in a predetermined direction due to the rotating force of the rotary driver; a reflective mirror rotated together with the mirror body, the reflective mirror being tiltably disposed inside the mirror body; and a tilting driver receiving the rotating force of the rotary driver to allow the reflective mirror to be tiltably driven.

The rotary driver may include: a stage on which the mirror body and the tilting driver are disposed; a vertical rotating shaft passing through the stage, the vertical rotating shaft being shaft-connected to the mirror body; and a rotary motor rotating the vertical rotating shaft.

The tilting driver may include: a power transmission part pivoted together with the mirror body, the power transmission part receiving the rotating force of the rotary driver; and a power conversion part converting the rotating force transmitted from the power transmission part into a straight line reciprocating motion.

The power transmission part may include a rotary member disposed outside sidewalls of the mirror body and pivoted together with the mirror body along the vertical rotating shaft.

The rotary member may be pivoted along the vertical rotating shaft and rotated along a horizontal rotation center axis of the sidewalls of the mirror body perpendicular to the vertical rotating shaft.

The power transmission part may further include a first gear rotatably shaft-connected to a side of the rotary member and a second gear engaged with the first gear to adjust a rotation ratio between the first gear and the second gear.

The rotary member may include a rotary wheel in surface contact with a top surface of the stage.

The rotary member may include a circular gear disposed on a top surface of the stage and a bevel gear engaged with the circular gear.

The power conversion part may include a crankshaft rotatably shaft-connected to the power transmission part and a rod connected to the crankshaft to convert a rotary motion into the straight line reciprocating motion, thereby tilting the reflective mirror.

The crankshaft may be rotatably shaft-connected to the second gear.

The rod may have one end link-coupled to the crankshaft and the other end hinge-coupled to the reflective mirror.

The reflective mirror may be tiltably disposed with respect to a horizontal rotating shaft connected to inner surfaces of both sidewalls of the mirror body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
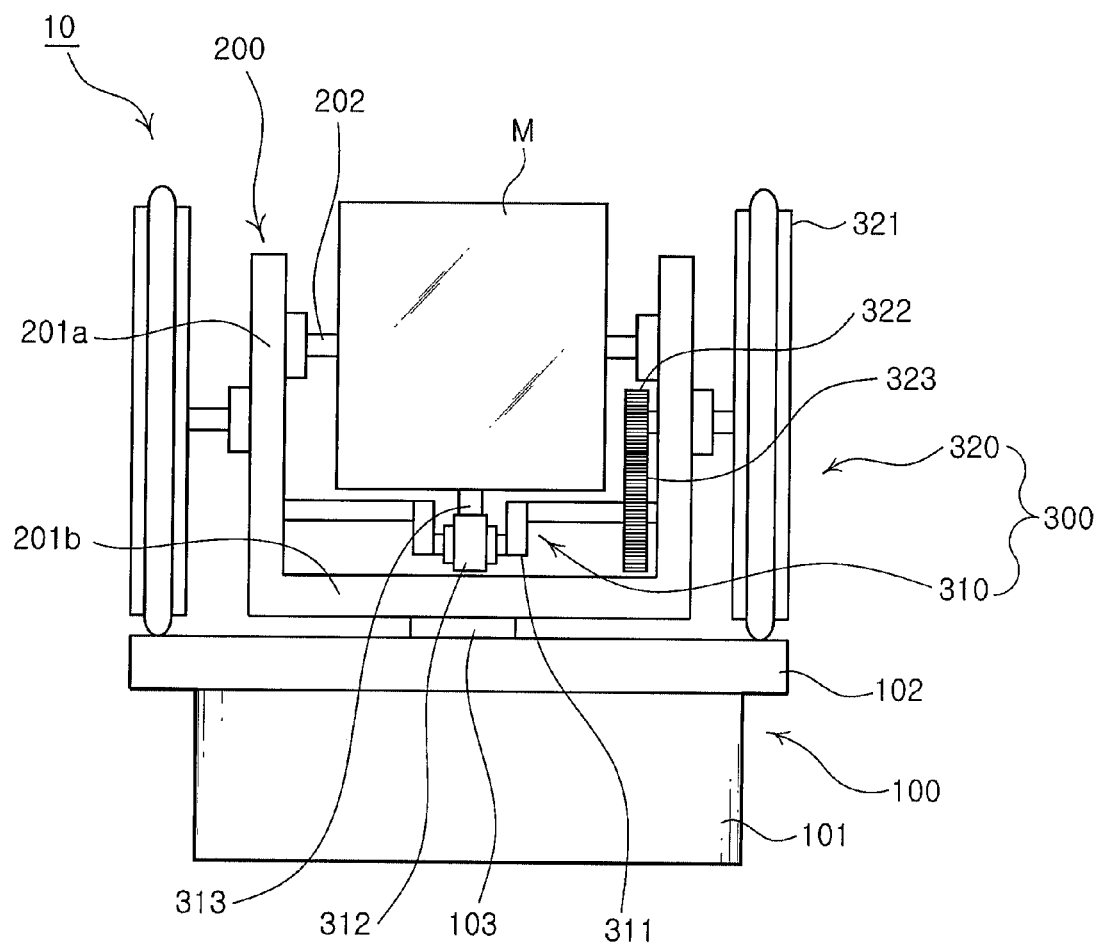
FIG. 1 is a front view of a space scanner for a self-control moving object according to an embodiment of the present invention.
Figure 2:
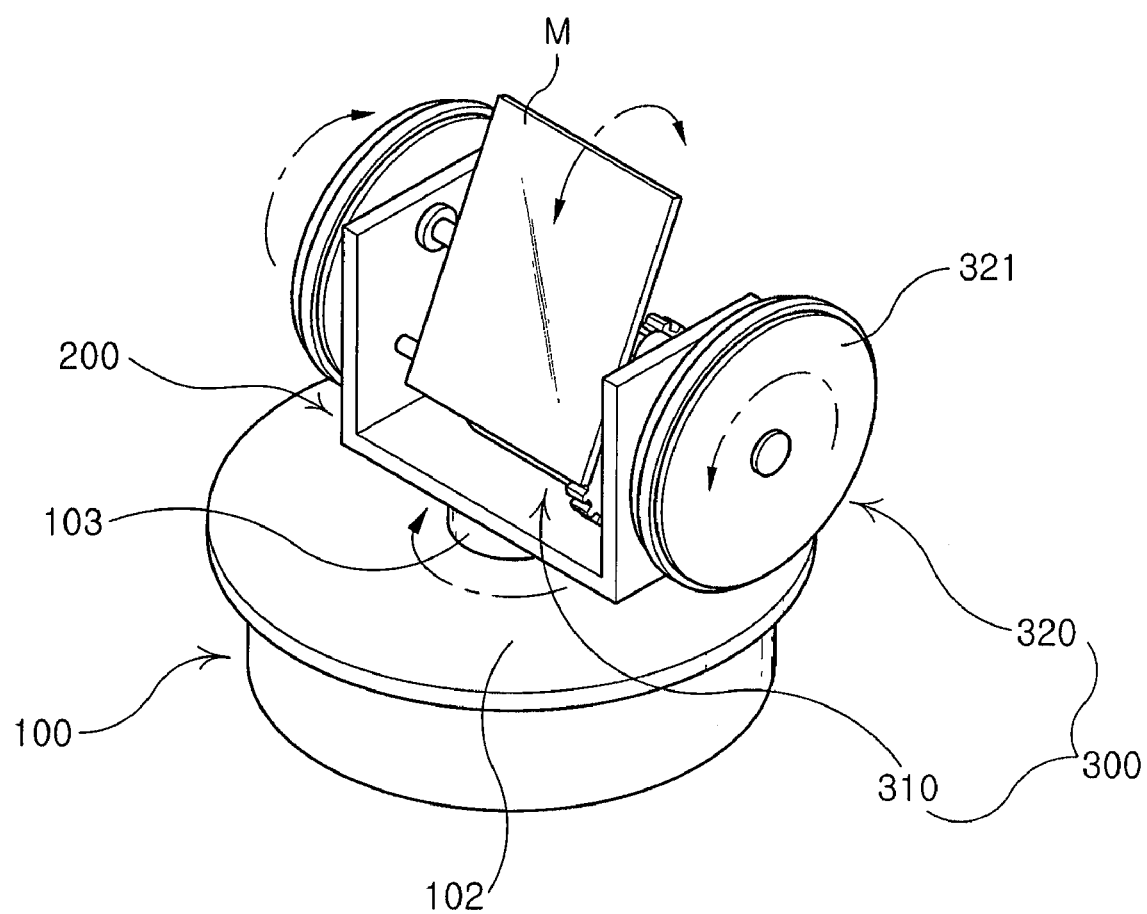
FIG. 2 is a schematically perspective view illustrating an operation of the space scanner for a self-control moving object of FIG. 1.
Figure 3:
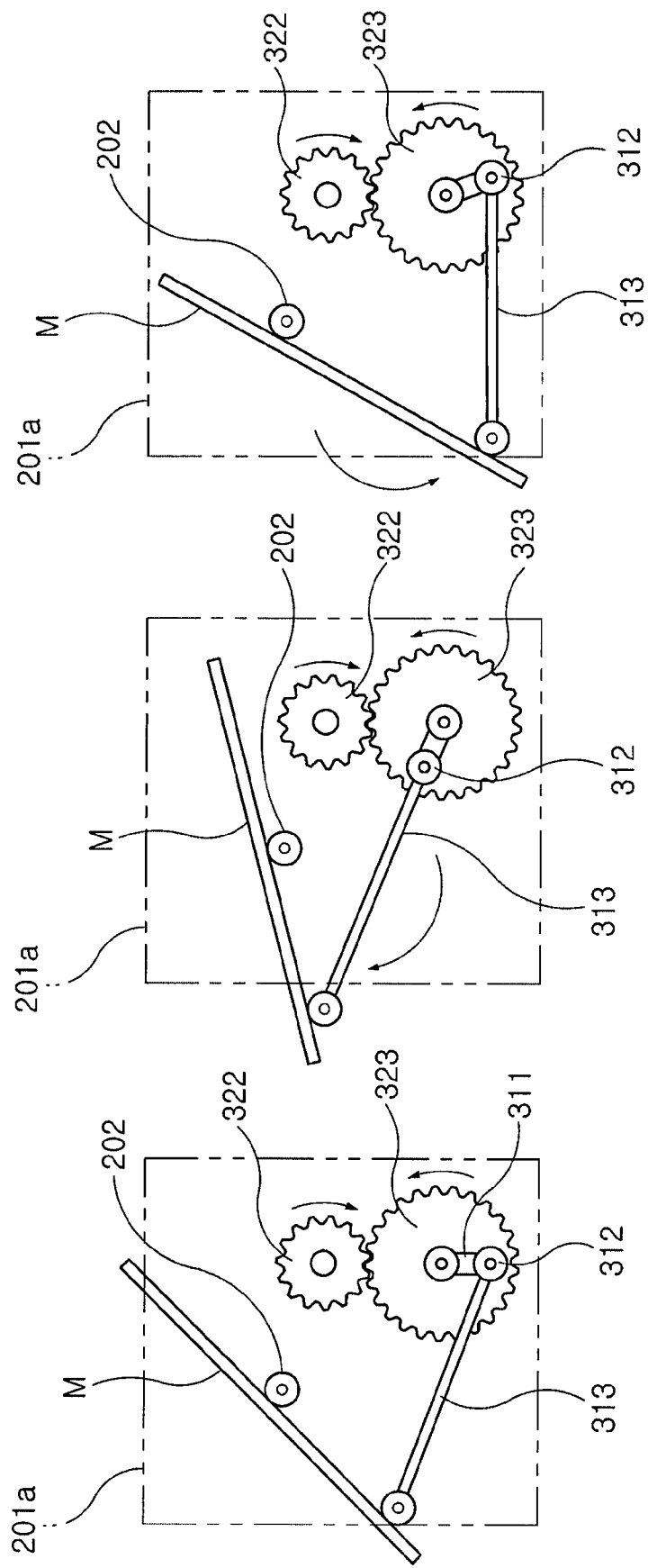
FIGS. 3A to 3C are a schematic view illustrating a tilting process of a reflective mirror of the space scanner for a self-control moving object of FIG. 1.

FIG. 1 is a front view of a space scanner for a self-control moving object according to an embodiment of the present invention, FIG. 2 is a schematically perspective view illustrating an operation of the space scanner for a self-control moving object of FIG. 1, and FIG. 3 is a schematic view illustrating a tilting process of a reflective mirror of the space scanner for a self-control moving object of FIG. 1.

Referring to FIGS. 1 and 2, a space scanner for a self-control moving object according to the present invention includes a rotary driver 100, a mirror body 200, a reflective mirror M, and a tilting driver 300.

The rotary driver 100 generates a rotating force for driving the space scanner of the self-control moving object according to the present invention. A rotary motor 101 rotating a vertical rotating shaft 103 when a power is supplied is disposed in a lower portion of the rotary driver 100. The rotary motor 101 may be disposed inside a case for mechanical protection.

A stage 102 having a disk shape is disposed on the rotary motor 101. The mirror body 200 and the tilting driver 300 are disposed on the stage 102 so that the mirror body 200 and the tilting driver 300 are separated from the rotary motor 101.

The vertical rotating shaft 103 passing through a substantially central portion of the stage 102 is shaft-connected to the mirror body 200 and is continuously rotated by the rotary motor 101.

The rotating force generated by the rotary motor 101 is transmitted to the mirror body 200 disposed on the stage 102 and the tilting driver 300 through the vertical rotating shaft 103 to rotate the mirror body 200 and the tilting driver 300.

Although the stage 102 has the disk shape in this embodiment, the present invention is not limited thereto. For example, the stage 102 may have a polygonal plate structure.

The mirror body 200 is disposed on the stage 102 and shaft-connected to the vertical rotating shaft 103. Thus, the mirror body 200 is rotated in a predetermined direction by the rotating force of the rotary driver 100.

As illustrated in FIG. 1, the mirror body 200 includes a horizontal part 201b shaft-connected to the vertical rotating shaft 103 at the substantially central portion and sidewalls 201a extending from both left-right ends of the horizontal part 201b in a vertically upward direction. Therefore, the mirror body 200 has a sharp-edged "U" shape in an overall profile.

The reflective mirror M is disposed inside the mirror body 200. The reflective mirror M is tiltable with respect to a horizontal rotating shaft 202 connected to inner surfaces of the sidewalls 201a of the mirror body 200.

That is, the reflective mirror M is hinge-coupled along the horizontal rotating shaft 202 passing through the mirror body 200 and connecting one sidewall to an opposite sidewall of the mirror body 200. Thus, the reflective mirror M is not fixed at only a constant angle (45 degrees), but tilted at various angles.

The reflective mirror M reflects a laser light irradiated from a laser irradiation device (not shown) into a peripheral region of the self-control moving object. Also, the reflective mirror M receives a laser light that is reflected by an obstacle to return to the self-control moving object to reflect the received laser light again into a photo detector (not shown).

Thus, the reflective mirror M is continuously rotated together with the mirror body 200 at a constant speed inside the mirror body 200. Therefore, it is possible to scan a full 360 degrees along the peripheral region of the self-control moving object.

Since the reflective mirror M is not fixed at a 45 degrees, but tilted within a range of the various angles to scan the peripheral region of the self-control moving object in a vertical direction, it is possible to obtain three-dimensional spatial-data including a two-dimensional distance data with respect to a horizontal surface according to a specific height as well as vertical distance data.

The tilting driver 300 receives the rotating force of the rotary driver 100 to tiltably drive the reflective mirror M. The tilting driver 300 includes a power transmission part 320 and a power conversion part 310.

The space scanner for a self-control moving object according to the present invention uses the rotating force of the rotary driver 100 to tiltably drive the reflective mirror M. That is, the reflective mirror M is rotated around the full 360 degrees by the rotating force of the rotary driver 100 and tilted within a range of a predetermined angle.

For this, the power transmission part 320 is pivoted together with the mirror body 200 about the vertical rotating shaft 103 and receives the rotating force of the rotary driver 100.

The power transmission part 320 is rotatably disposed outside the sidewall of the mirror body 200. The power transmission part 320 includes a rotary member 321 pivoted and rotated along a top surface of the stage 102 when the mirror body is rotated.

The rotary member 321 is pivoted along the vertical rotating shaft 103 while rotating along a horizontal rotation center axis of the sidewall 201a of the mirror body 200 perpendicular to the vertical rotating shaft 103.

The rotary member 321 may be provided with a pair, and the pair of rotary members 321 is disposed on the both sidewalls of the mirror body 200, respectively.

The rotary member 321 has one side in which a first gear 322 is shaft-connected thereto and rotated together therewith, and a second gear 323 is engaged with the first gear 322 to adjust a rotation ratio between the first gear 322 and the second gear 323.

The first gear 322 and the second gear 323 are rotatably disposed inside the mirror body 200 with respect to the sidewall 201a of the mirror body 200.

The first gear 322 and the second gear 323 may have diameters different from each other to adjust a rotation speed of the rotary member 321.

Although the first gear 322 is rotatably engaged with the second gear 323 in this embodiment, the present invention is not limited thereto. For example, the first gear 322 may be rotatably coupled to the second rear 323 using a belt-pulley.

An outer surface of the rotary member 321 is in surface contact with the top surface of the stage 102, and each rotary member 321 is rotatably disposed outside the sidewall of the mirror body 200. Thus, in case where the rotary member 321 is pivoted (revolution) together with the mirror body 200 with respect to the vertical rotating shaft 103, the rotary member 321 rotates (rotation) on the sidewall of the mirror body 200.

The rotary member 321 may include a rotatable rotary wheel in surface contact with the top surface of the stage 102.

The power conversion part 310 converts the rotating force of the rotary driver transmitted from the power transmission part 320 into a straight line reciprocating motion to tilt the reflective mirror M.

The power conversion part 310 includes a crankshaft 312 and a rod 313. The crankshaft 312 is rotatably shaft-connected to the power transmission part 320. The rod 313 is link-connected to the crankshaft 312 to convert a rotary motion into the straight line reciprocating motion. Thus, the rod 313 tilts the reflective mirror M tiltably disposed along the horizontal rotating shaft 202.

The crankshaft 312 may be rotatably shaft-connected to the second gear 323 and rotate together with the second gear 323.

The rod 313 may have one end link-coupled to the crankshaft 312 and the other end hinge-coupled to the reflective mirror M.

Thus, the crankshaft 312 is rotated by the rotating force transmitted from the power transmission part 320

The rod 313, link-connected to the crankshaft 312, tilts the reflective mirror M tiltably disposed along the horizontal rotating shaft 202 by converting the rotary motion into straight line reciprocating motion.

FIG. 3 schematically illustrates a tilting process of the reflective mirror M. As illustrated in FIG. 3, when the first gear 322 is rotated at a predetermined speed by the rotary member 321, the second gear 323 engaged with the first gear 322 is rotated at the adjusted rotation ratio. Therefore, the crankshaft 312 is rotated with the same speed as the second gear 323.

The rod 313 has one end link-coupled to the crankshaft 312 and the other end hinge-coupled to the reflective mirror M. The one end of the rod 312 is pivoted together with a crank arm 311 of the crankshaft 312 with respect to a rotation center axis of the second gear 323 to allow the other end of the rod 313 to perform a straight line reciprocating motion.

Thus, the reflective mirror M tiltably disposed with respect to the horizontal rotating shaft 202 within the mirror body 200 is tilted along the horizontal rotating shaft 202 within a range of a predetermined angle due to the straight line reciprocating motion of the rod 313.

A space scanner for a self-control moving object according to another embodiment of the present invention will be described in detail with reference to FIGS. 4 and 5.

Figure 4:
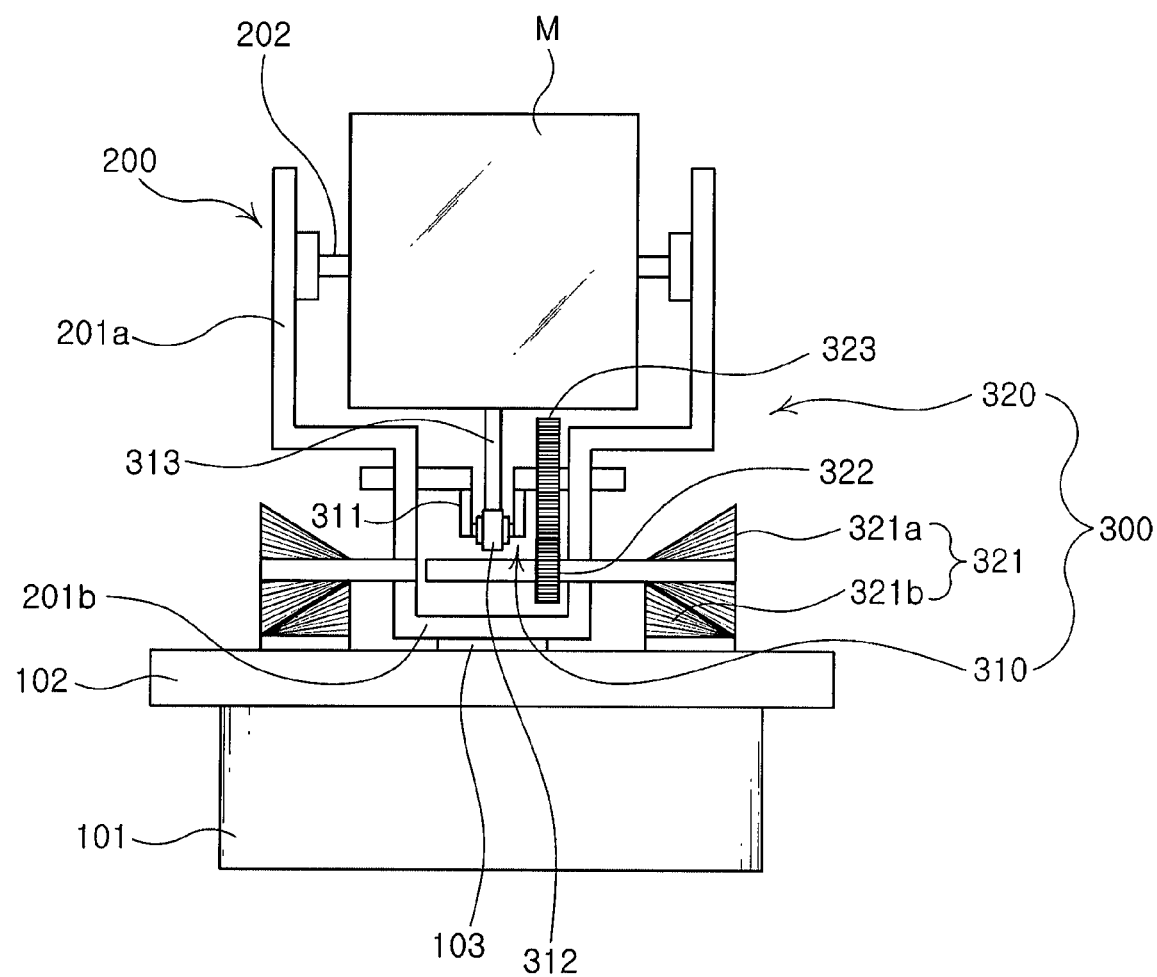
FIG. 4 is a front view of a space scanner for a self-control moving object according to another embodiment of the present invention.
Figure 5:
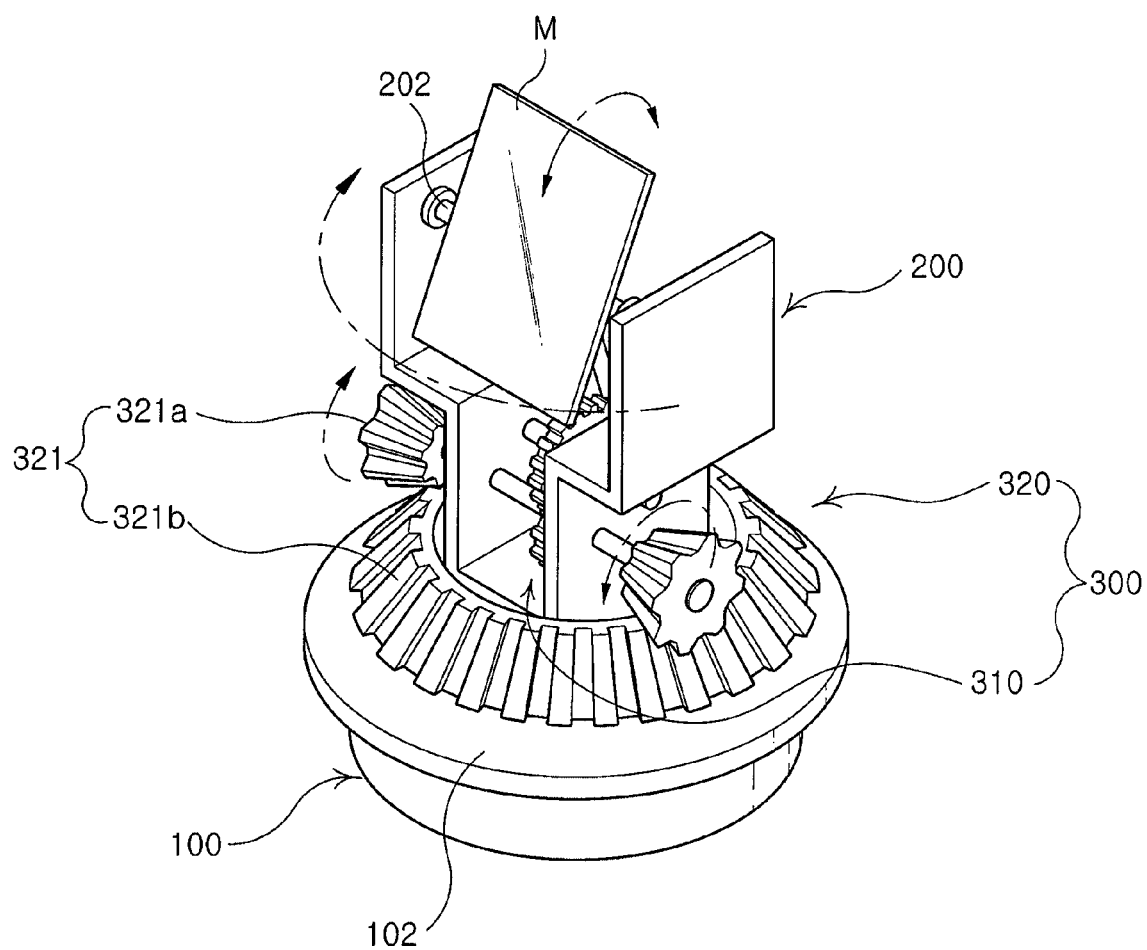
FIG. 5 is a schematically perspective view illustrating an operation of the space scanner for a self-control moving object of FIG. 4.

FIG. 4 is a front view of a space scanner for a self-control moving object according to another embodiment of the present invention, and FIG. 5 is a schematically perspective view illustrating an operation of the space scanner for a self-control moving object of FIG. 4.

The space scanner for a self-control moving object of the embodiment of FIGS. 4 and 5 has the substantially same constitution as that of FIGS. 1 to 3.

However, since the embodiment of FIGS. 4 and 5 is different from that of FIGS. 1 to 3 in concrete constitutions of the rotary member 321 of the power transmission part 320, explanations of the same parts as those of the previous embodiment are omitted, and constitutions and operations with respect to a rotary member of a power transmission part will be mainly described below.

Referring to FIGS. 4 and 5, power transmission parts 320 are rotatably disposed outside both sidewalls 201a of a mirror body 200, respectively. Each of the power transmission parts includes a pair of rotary members 321 respectively pivoted and rotated along a top surface of a stage 102 when the mirror body 200 is rotated.

The rotary members 321 may include a circular gear 321b disposed on the top surface of the stage 102 and a bevel gear 321a engaged with the circular gear 321b.

The mirror body 200 including the rotary members 321 is divided into an upper portion in which the reflective mirror M is disposed and a lower portion in which a tilting driver 300 is disposed. The mirror body 200 has a stepped structure in which the both sidewalls 201a thereof become narrow in width.

In this case, since the rotary member 321 is disposed along a step portion of the mirror body 200 and disposed in a space generated by the step portion, an overall size of the mirror body 200 can be reduced.

The circular gear 321b of the rotary member 321 is disposed on the top surface of the stage 102 with respect to a vertical rotating shaft 103, and the bevel gear 321a is engaged with the circular gear 321b and rotatably disposed outside each of the both sidewalls of the mirror body 200.

Thus, in case where the rotary member 321 is pivoted (revolution) together with the mirror body 200 with respect to the vertical rotating shaft 103 as illustrated in FIG. 5, the bevel gear 321a is engaged with the circular gear 321b and rotated (rotation) on the sidewall 201a of the mirror body 200.

As the bevel gear 321a of the rotary member 321 is rotated, a crankshaft 321 of a power conversion part 310 is rotated due to the rotating force.

As described above, since the moving object positioning apparatus according to the present invention has a structure in which the reflective mirror is rotated and tilted, the laser light within the self-control moving object can be reflected in the horizontal and vertical directions to scan the moving object, thereby obtaining the spatial-data.

While the present invention has been shown and described in connection with the exemplary embodiments, it will be apparent to those skilled in the art that modifications and variations can be made without departing from the spirit and scope of the invention as defined by the appended claims.

What is claimed is:

1. A space scanner for a self-controlled moving object, comprising:
a rotary driver generating a rotating force;
a mirror body having sidewalls facing each other and rotated in a predetermined direction due to the rotating force of the rotary driver;
a reflective mirror rotated together with the mirror body, and tiltably disposed with respect to a horizontal rotating shaft connected to inner surfaces of both sidewalls of the mirror body; and
a tilting driver receiving the rotating force of the rotary driver to allow the reflective mirror to be tiltably driven,
wherein the tilting driver comprises a power transmission part pivoted together with the mirror body, the power transmission part receiving the rotating force by contacting the rotary driver; and
a power conversion part converting the rotating force transmitted from the power transmission part into a straight line reciprocating motion using a crankshaft rotatably shaft-connected to the power transmission part.

2. The space scanner of claim 1, wherein the rotary driver comprises:
a stage on which the mirror body and the tilting driver are disposed;
a vertical rotating shaft passing through the stage, the vertical rotating shaft being shaft-connected to the mirror body; and
a rotary motor rotating the vertical rotating shaft.

3. The space scanner of claim 2, wherein the power transmission part comprises a rotary member disposed outside sidewalls of the mirror body and pivoted together with the mirror body along the vertical rotating shaft.

4. The space scanner of claim 3, wherein the rotary member is pivoted along the vertical rotating shaft and rotated along a horizontal rotation center axis of the sidewalls of the mirror body perpendicular to the vertical rotating shaft.

5. The space scanner of claim 3, wherein the power transmission part further comprises a first gear rotatably shaft-connected to a side of the rotary member and a second gear engaged with the first gear to adjust a rotation ratio between the first gear and the second gear.

6. The space scanner of claim 4, wherein the rotary member comprises a rotary wheel in surface contact with a top surface of the stage.

7. The space scanner of claim 4, wherein the rotary member comprises a circular gear disposed on a top surface of the stage and a bevel gear engaged with the circular gear.

8. The space scanner of claim 5, wherein the power conversion part further comprises a rod connected to the crankshaft to convert a rotary motion into the straight line reciprocating motion, thereby tilting the reflective mirror.

9. The space scanner of claim 8, wherein the crankshaft is rotatably shaft-connected to the second gear.

10. The space scanner of claim 8, wherein the rod has one end link-coupled to the crankshaft and the other end hinge-coupled to the reflective mirror.

* * * * *